(12) United States Patent
Namuduri et al.

(10) Patent No.: US 7,919,949 B2
(45) Date of Patent: Apr. 5, 2011

(54) HIGH EFFICIENCY GENERATOR

(75) Inventors: Chandra S. Namuduri, Troy, MI (US);
Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 12/114,008

(22) Filed: May 2, 2008

(65) Prior Publication Data

US 2008/0284385 A1 Nov. 20, 2008

Related U.S. Application Data

(60) Provisional application No. 60/938,573, filed on May 17, 2007.

(51) Int. Cl.
*H02P 9/30* (2006.01)
(52) U.S. Cl. .......................................... 322/24; 322/37
(58) Field of Classification Search ............... 322/20, 322/22, 24, 28, 37, 99
See application file for complete search history.

(56) References Cited

U.S. PATENT DOCUMENTS

| | | | | |
|---|---|---|---|---|
| 5,291,106 A | * | 3/1994 | Murty et al. ............... 318/375 |
| 5,543,703 A | * | 8/1996 | Kusase et al. .................. 322/16 |
| 5,726,559 A | * | 3/1998 | Taniguchi et al. ............... 322/34 |
| 5,731,689 A | * | 3/1998 | Sato ................................ 322/25 |
| 5,739,677 A | * | 4/1998 | Tsutsui et al. .................. 322/25 |
| 6,265,841 B1 | * | 7/2001 | Buthker .................. 318/400.28 |
| 6,940,259 B2 | * | 9/2005 | Suzuki et al. ................... 322/20 |
| 7,116,080 B2 | * | 10/2006 | Chen .............................. 322/24 |
| 7,135,784 B2 | | 11/2006 | Murty et al. |
| 2010/0060245 A1 | * | 3/2010 | Namuduri et al. ............... 322/89 |

FOREIGN PATENT DOCUMENTS

JP 2005-210895 A 8/2005

* cited by examiner

*Primary Examiner* — Nicholas Ponomarenko
(74) *Attorney, Agent, or Firm* — John A. Miller; Miller IP Group, PLC

(57) ABSTRACT

A generator system that includes a three-phase AC machine and an active rectifier bridge employing low on-resistance MOSFET switches for converting the AC current from the machine to a DC current. The system also includes a switch control circuit to switch the MOSFET switches in synchronization with the three-phase current flow. The system determines the phase-to-ground voltages of the machine as inputs to the switch control circuit. The control circuit calculates the phase-to-phase voltages from the phase-to-ground voltages. The control circuit then determines if each of the phase-to-phase voltages is above or below first and second predetermined threshold voltages, where if the phase-to-phase voltage is above the first threshold voltage, the control circuit closes the switch, and if the phase-to-phase voltage is below the second threshold voltage, the control circuit opens the switch.

27 Claims, 5 Drawing Sheets

HIGH EFFICIENCY GENERATOR

CROSS-REFERENCE TO RELATED APPLICATIONS

This application claims the benefit of the filing date of U.S. Provisional Application No. 60/938,573, filed May 17, 2007, titled High Efficiency Generator.

BACKGROUND OF THE INVENTION

1. Field of the Invention

This invention relates generally to a generator system and, more particularly, to a generator system for a vehicle that includes an active rectifier bridge employing low on-resistance metal oxide semiconductor field effect transistor (MOSFET) switches and a control scheme for controlling the switches.

2. Discussion of the Related Art

Vehicles employ generators that are driven by a belt coupled to the vehicle engine to generate electrical power. Automotive electrical generators typically employ an AC synchronous machine with three-phase stator windings, a DC excitation winding on a claw-pole rotor, a voltage regulator and a three-phase diode bridge rectifier to produce a DC output. The excitation current of the synchronous machine is controlled by the voltage regulator to regulate the DC output voltage of the generator. Permanent magnets have been employed in the claw-pole device to increase the power output and efficiency of the generator for a given generator.

High efficiency generators usually employ shaped conductor stator windings to reduce copper losses, thinner stator laminations to reduce iron losses, low friction bearings, a laminated rotor construction and permanent magnetic excitation, all of which add significant cost and/or mass to the generator.

As mentioned above, known generator assemblies typically employ a three-phase diode bridge to convert the AC current to a DC current, where the diodes conduct depending on the propagation direction of the current through the three-phase coils. A three-phase machine generally requires six diodes. The three-phase diode bridge generally contributes 20%-50% of the total losses of the generator. Particularly, the amount of power used to conduct the diodes may provide a power loss at 100 amps of about 180 watts and a total diode voltage loss of about 1.8 volts.

SUMMARY OF THE INVENTION

In accordance with the teachings of the present invention, a generator system is disclosed that includes a three-phase AC machine and an active rectifier bridge employing low on-resistance switches, such as MOSFET switches, for converting the AC current from the machine to a DC current. The system also includes a switch control circuit to switch the MOSFET switches in synchronization with the three-phase current flow. The system utilizes the phase-to-ground voltages or the phase-to-phase voltages of the machine as inputs to the switch control circuit. If the phase-to-ground voltages are measured, the control circuit first determines the phase-to-phase voltages from the phase-to-ground voltages. The phase-to-phase voltages can also be measured directly using differential amplifier circuits. The control circuit then determines if each of the phase-to-phase voltages is above or below first and second predetermined threshold voltages, where if the phase-to-phase voltage is above the first threshold voltage, the control circuit closes the switch, and if the phase-to-phase voltage is below the second threshold voltage, the control circuit opens the switch. The system also disables the switches if the speed of the machine is below a predetermined threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a generator system employing an active rectifier bridge including MOSFET switches is merely exemplary in nature, and is in no way intended to limit the invention or its applications or uses.

Figure 1:
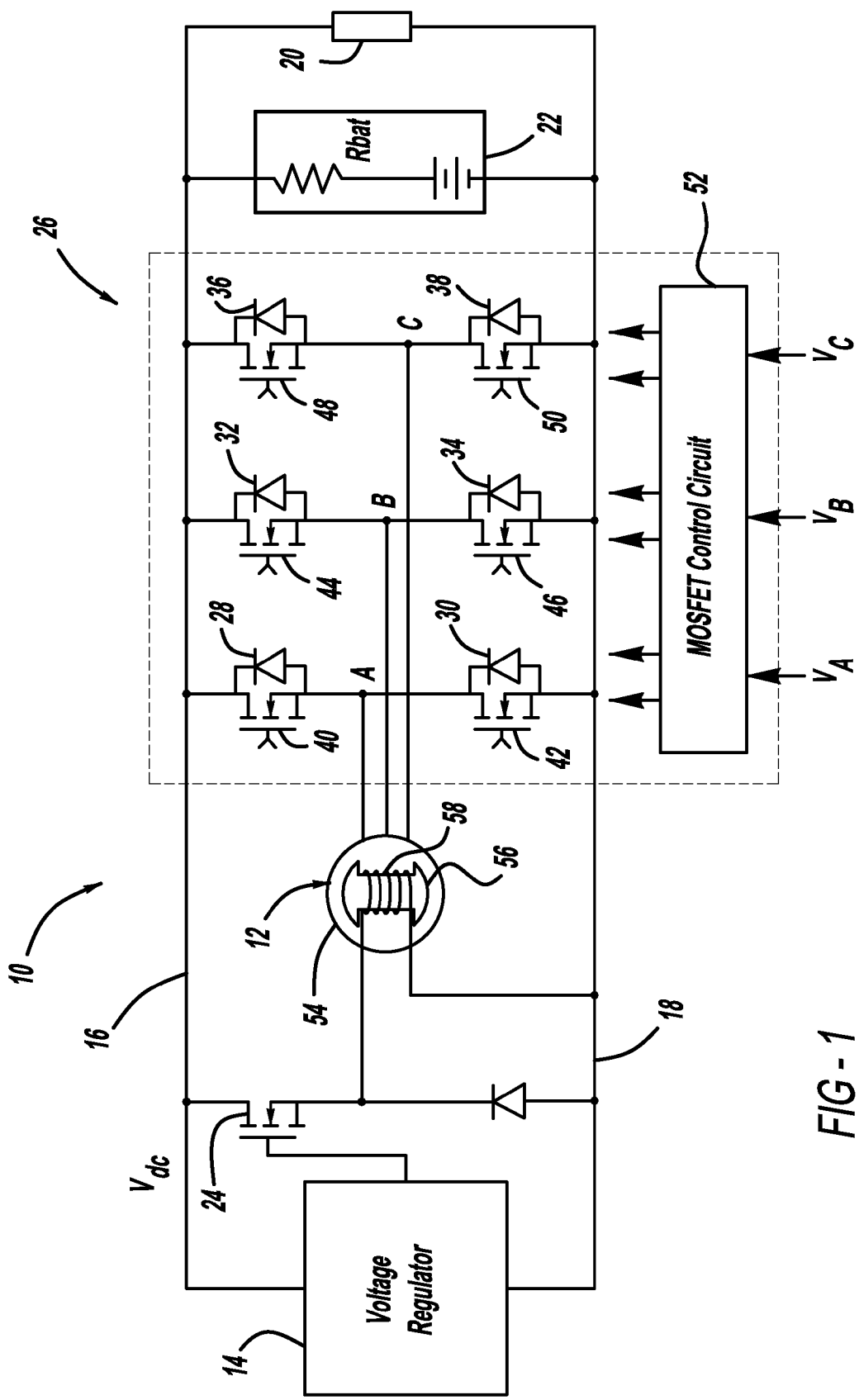
FIG. 1 is a schematic diagram of a generator system including an active rectifier bridge employing MOSFET switches, according to an embodiment of the present invention.

FIG. 1 is a schematic diagram of a generator system 10, according to an embodiment of the present invention. The system 10 includes a three-phase wound rotor synchronous machine 12, such as claw-pole machine, having a field coil 58 in a rotor 56 of the machine 12 and three-phase AC synchronous armature coils in a stator 54 of the machine 12. In this non-limiting embodiment, the machine 12 is a Lundell machine. Permanent magnets can be incorporated in the rotor 56 of the machine 12 between the claw-poles to provide additional flux to that produced by the field coil 58, where the total flux is responsible to produce voltage in the armature coils.

The system 10 also includes a voltage regulator 14 that regulates the DC voltage $V_{dc}$ produced between a positive rail 16 and a negative rail 18 of the system 10 by rectification of the generated AC voltage. The DC voltage is used to drive DC loads 20 in the vehicle, and to charge a vehicle battery 22, where the resistance Rbat is the internal resistance of the battery 22. The voltage regulator 14 provides pulse width modulation (PWM) control for the field coil 58 within the machine 12. Particularly, the voltage regulator 14 provides a signal to a MOSFET switch 24 that allows controlled current to be sent to the field coil 58.

The system 10 includes an inverter/rectifier circuit 26 having a plurality of diodes 28, 30, 32, 34, 36 and 38 that pass and block current flow to rectify the AC current from the armature coils to a DC current to operate the loads 20 and charge the vehicle battery 22. The inverter/rectifier circuit 26 also includes a plurality of MOSFET switches 40, 42, 44, 46, 48 and 50 that are coupled across the diodes 28, 30, 32, 34, 36 and 38, respectively, and provide a low resistance current path around the diode when the diode is conducting, i.e., when current is flowing in a forward bias direction through the diode. A switch control circuit 52 controls whether the switches 40, 42, 44, 46, 48 and 50 are opened or closed in association with whether the diode 28, 30, 32, 34, 36 or 38 is conducting. The diodes 28, 30, 32, 34, 36 and 38 can be integral body-drain diodes within the respective MOSFET switches 40, 42, 44, 46, 48 and 50. Additionally, the diode 28, 30, 32, 34, 36 and 38 can be zener diodes having a voltage clamping capability when subjected to reverse overvoltage in excess of a reverse breakdown voltage.

The phase-to-ground voltages $V_A$, $V_B$ and $V_C$ between the stator terminals, identified by nodes A, B and C in the circuit 26, and battery ground or the negative rail 18, are input to the control circuit 52 to determine the rotor position of the machine 12. Voltage divider circuits (not shown) can be employed to divide the phase voltages between nodes A, B and C and the ground rail 18 to a level suitable for the control circuit 52. This information allows the control circuit 52 to know which of the switches 40, 42, 44, 46, 48 and 50 to close to provide the current rectification. Particularly, when the appropriate diode 28, 30, 32, 34, 36 and 38 is conducting for providing rectification, the switch 40, 42, 44, 46, 48 or 50 associated with that diode 28, 30, 32, 34, 36 or 38 is closed to provide a low current path that by-passes the diode 28, 30, 32, 34, 36 or 38. Output lines from the control circuit 52 are applied to the gate terminal of the MOSFET switches 40, 42, 44, 46, 48 and 50 to provide the signal that closes the switch.

The turn-on and turn-off points of each MOSFET switch 40, 42, 44, 46, 48 and 50 are controlled by comparing the phase-to-phase voltages with a predetermined upper and lower threshold level during positive and negative half-cycles of the output waveform from the machine 12. The control circuit 52 for the MOSFET switches 40, 42, 44, 46, 48 and 50 also detects the generator speed (RPM) using the frequency of one or more of the phase-to-ground voltages $V_A$, $V_B$ and $V_C$. For generator speeds below a predetermined threshold, the switching of the MOSFET switches 40, 42, 44, 46, 48 and 50 is disabled to prevent undesirable discharge of the battery 22 through the generator windings.

Figure 2A:
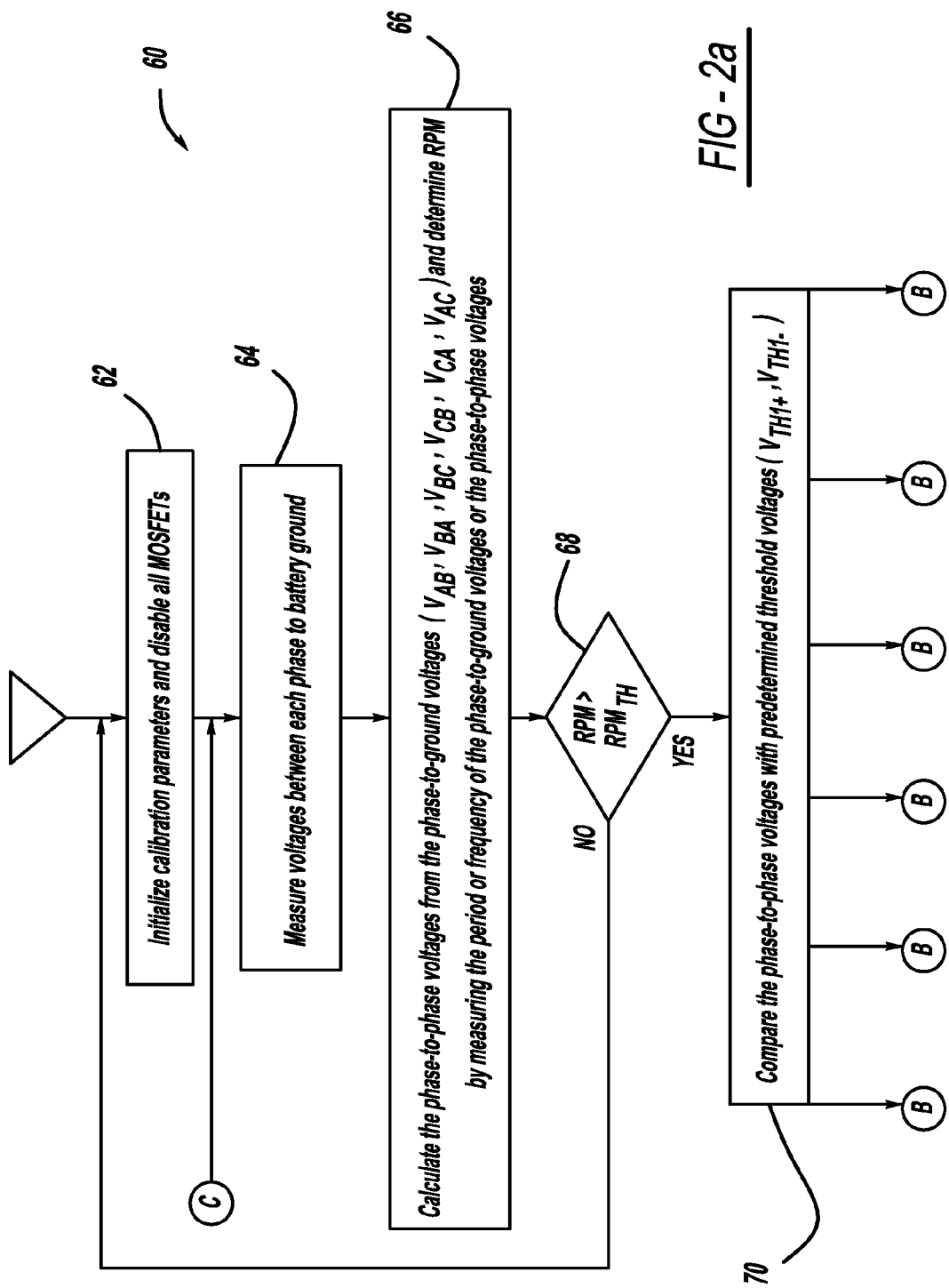
FIGS. 2(a)-2(b) are a flow chart diagram showing a process for selectively turning on and off the MOSFET switches in the generator system of FIG. 1, according to an embodiment of the present invention.
Figure 2B:
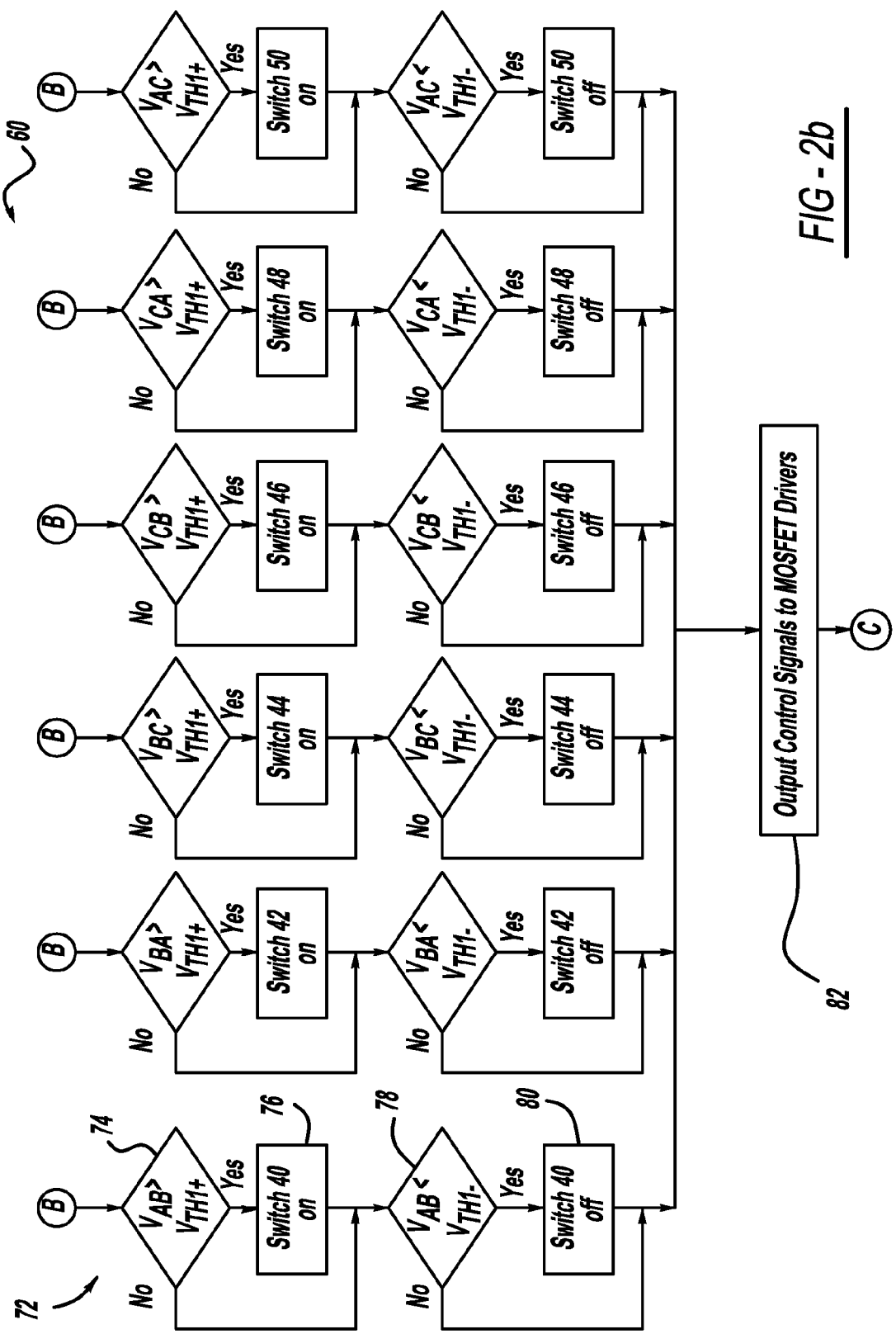

FIGS. 2(a)-2(b) are a flow chart diagram 60 showing an operation for switching the MOSFET switches 40, 42, 44, 46, 48 and 50 to provide the current rectification, according to an embodiment of the present invention. The algorithm initializes the calibration parameters and disables (opens) the MOSFET switches 40, 42, 44, 46, 48 and 50 at box 62. The calibration parameters can include the voltage thresholds and the minimum RPM, both discussed below, used by the control circuit 52, and other system parameters necessary for the operation of the generator system 10.

The algorithm then measures the voltages between each phase and battery ground to get the phase-to-ground voltages $V_A$, $V_B$ and $V_C$ for the inputs to the control circuit 52 at box 64. The phase-to-ground voltages $V_A$, $V_B$ and $V_C$ may need to be attenuated or scaled to a level suitable for the digital circuitry in the control circuit 52. The algorithm then calculates the phase-to-phase voltages $V_{AB}$, $V_{BA}$, $V_{BC}$, $V_{CB}$, $V_{CA}$ and $V_{AC}$ from the phase-to-ground voltages $V_A$, $V_B$ and $V_C$ as $V_A-V_B$, $V_B-V_A$, $V_B-V_C$, $V_{C-VB}$, $V_C-V_A$ and $V_A-V_C$, respectively, at box 66. It is also possible to calculate $V_{BA}$, $V_{CB}$ and $V_{AC}$ directly from $V_{AB}$, $V_{BC}$ and $V_{CA}$ as $V_{BA}=-V_{AB}$, $V_{CB}=-V_{BC}$ and $V_{AC}=-V_{CA}$. It is also possible to measure the phase-to-phase voltages directly using differential amplifiers or other suitable devices.

The algorithm also determines the speed of the machine 12 at the box 66 using, for example, the frequency of one or more of the phase-to-ground voltages $V_A$, $V_B$ and $V_C$ or the frequency of one or more of the phase-to-phase voltages $V_{AB}$, $V_{BC}$ and $V_{CA}$. The algorithm then determines whether the RPM of the machine 12 is greater than a predetermined threshold $RPM_{TH}$ at decision diamond 68, and if not, returns to the box 62 for initializing the calibration parameters. The algorithm prevents switching on of the MOSFET switches 40, 42, 44, 46, 48 and 50 if the speed of the machine 12 is below a predetermined RPM to prevent undesirable discharge of the battery 22 through the machine windings.

If the speed of the machine 12 is greater than the threshold $RPM_{TH}$ at the decision diamond 68, then the algorithm compares the phase-to-phase voltages for each of the MOSFET switches 40, 42, 44, 46, 48 and 50 with predetermined threshold voltages $V_{TH1+}$ and $V_{TH1-}$ at box 70. If a particular phase-to-phase voltage is above the threshold voltage $V_{TH1+}$, then the algorithm will close the switch 40, 42, 44, 46, 48 or 50 associated with that phase-to-phase voltage. If a particular phase-to-phase voltage for a MOSFET switch 40, 42, 44, 46, 48 or 50 is below the threshold voltage $V_{TH1-}$, then the control circuit 52 will cause that switch to be opened. Once the particular MOSFET switch 40, 42, 44, 46, 48 or 50 is opened or closed it will stay in that position until the threshold is crossed to change its state. The threshold voltages $V_{TH1+}$ and $V_{TH1-}$ are selected so that the particular MOSFET switch 40, 42, 44, 46, 48 or 50 will be opened or closed to follow the conduction of the associated diode. In one embodiment, the threshold voltage $V_{TH1+}$ is in the range of $V_{dc}\pm1V$, or in the range of $V_{dc}$ to $V_{dc}+0.25V$, where $V_{dc}$ is the voltage across the positive rail 16 and the negative rail 18. In one embodiment, the threshold voltage $V_{TH1-}$ is in the range of $\pm1V$ or in the range of $-10$ mV to $+10$ mV.

Each comparison of the phase-to-phase voltages for each of the MOSFET switches 40, 42, 44, 46, 48 and 50 is shown on a separate channel 72. The algorithm determines whether the phase-to-phase voltage for the particular MOSFET switch 40, 42, 44, 46, 48 or 50 is greater than the predetermined threshold voltage $V_{TH1+}$ at decision diamond 74. If the phase-to-phase voltage is greater than the threshold voltage $V_{TH1+}$ at the decision diamond 74, then the algorithm closes that particular MOSFET switch 40, 42, 44, 46, 48 or 50 at box 76, otherwise, maintains the MOSFET switch 40, 42, 44, 46, 48 or 50 in its previous state. The algorithm then determines whether the phase-to-phase voltage is less than the threshold voltage $V_{TH1-}$ at decision diamond 78, and if so, opens the MOSFET switch 40, 42, 44, 46, 48 or 50 at box 80. Otherwise, the MOSFET switch 40, 42, 44, 46, 48 or 50 remains in its previous state. All of the output signals are then sent to the MOSFET switches 40, 42, 44, 46, 48 and 50 at box 82 and the process returns to the box 64.

It is envisioned that the voltage regulation function and the MOSFET control function could be independently provided by separate electronic control circuits or both functions could be integrated into a single electronic control circuit. The electronic control circuit may be implemented using a combination of discrete and/or integrated circuits, a microcontroller, a digital signal processor or an application specific integrated circuit (ASIC).

By using the MOSFET switches and the control method discussed above, the generator system 10 has a number of advantages over those generator systems that employed diode only rectifier bridges. Particularly, the generator system 10 has a significant reduction in generator rectification losses, a significant reduction in operating temperature of the heat sink, a potential to reduce the fan loss and noise by decreasing the fan air flow due to reduced heat load, an improvement in overall efficiency of the generator system 10, and an improvement in vehicle fuel economy. In addition, the control method described requires no additional sensors, such as phase current sensors, DC bus current sensors or rotor position sensors, which add significant cost and/or reduce the efficiency gain due to power loss in the sensors.

Figure 3A:
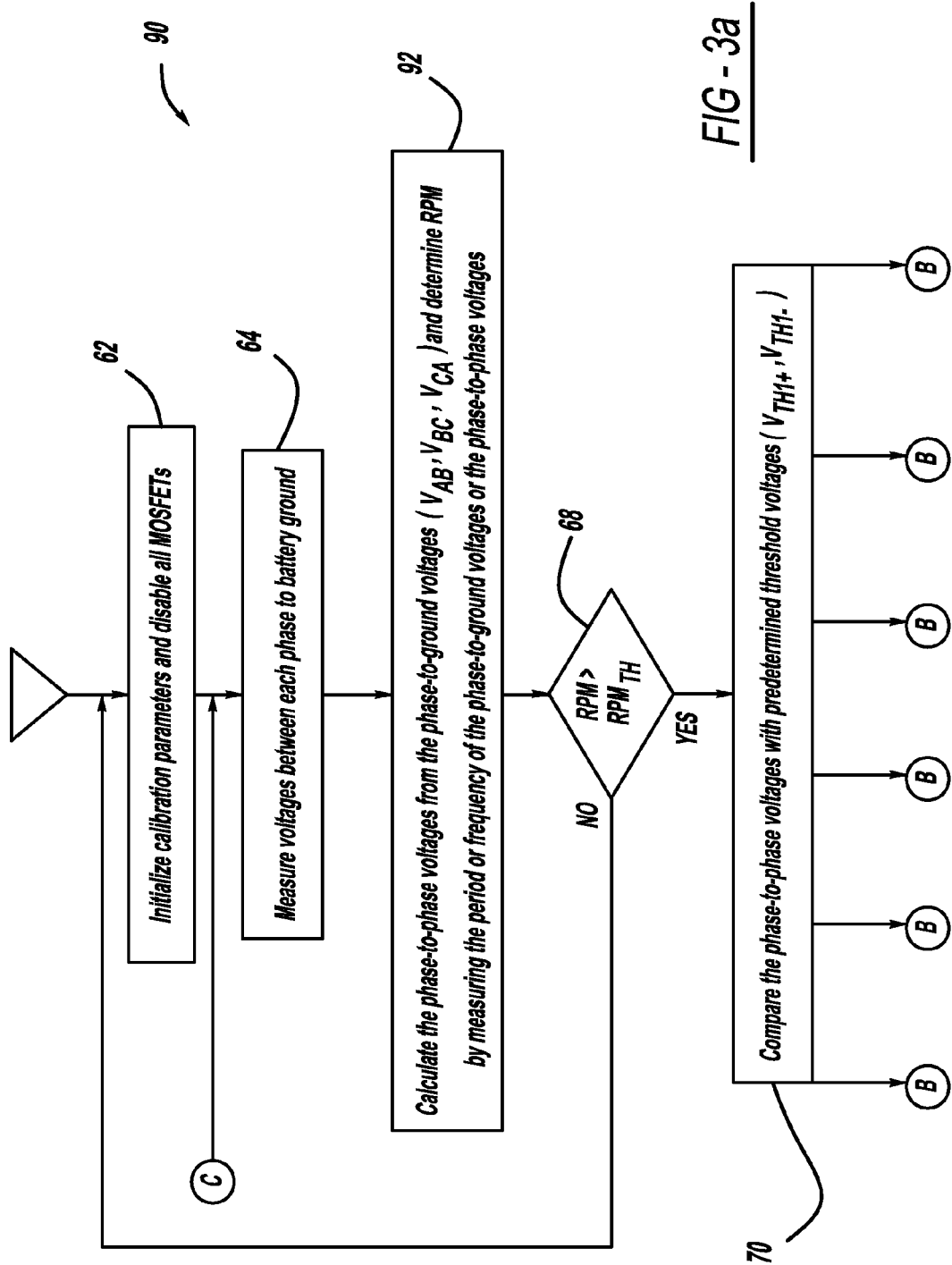
FIGS. 3(a)-3(b) are a flow chart diagram showing a process for selectively turning on and off the MOSFET switches in the generator system of FIG. 1, according to another embodiment of the present invention.
Figure 3B:
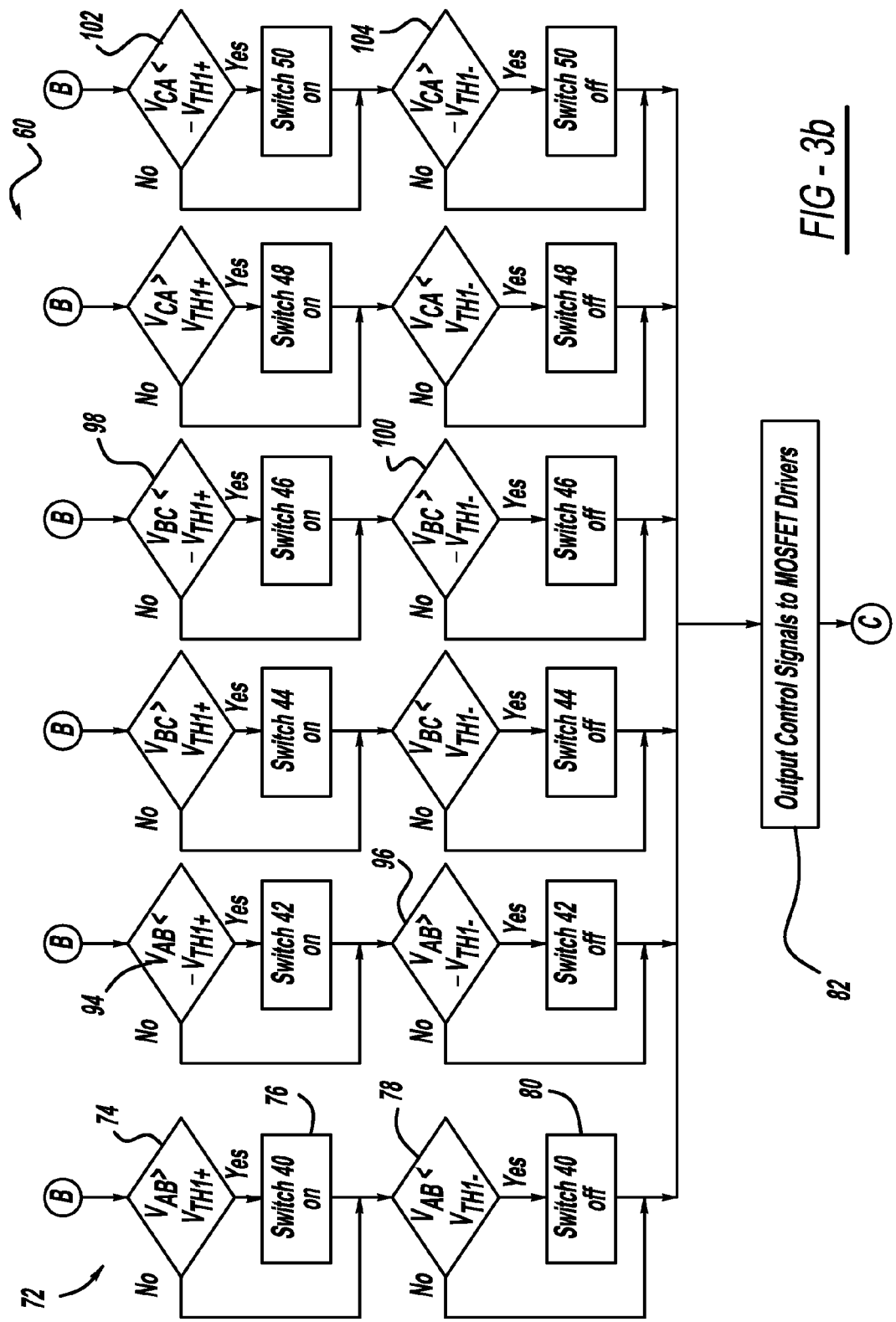

It is possible to use only the three phase-to-phase voltages $V_{AB}$, $V_{BC}$ and $V_{CA}$ to control the MOSFET switch 40, 42, 44, 46, 48 or 50. FIGS. 3(*a*)-3(*b*) are a flow chart diagram 90 showing an operation for switching the MOSFET switches 40, 42, 44, 46, 48 and 50 to provide to the current rectification, according to this embodiment of the present invention, where like elements to the flow chart diagram 60 are identified by the same reference numeral. In this embodiment, the box 66 has been replaced with box 92, where only the phase-to-phase voltages $V_{BA}$, $V_{CB}$ and $V_{AC}$ are calculated. Because the phase-to-voltages $V_{BA}$, $V_{CB}$ and $V_{AC}$ are not known, the comparison of those phase-to-phase voltages to the threshold voltages $V_{TH1}+$ and $V_{TH1}-$ needs to be changed to the phase-to-phase voltages that are known. Particularly, decision diamonds 94, 96, 98, 100, 102 and 104 in the flow chart diagram 90 have been changed to include the phase-to-phase voltages $V_{AB}$, $V_{BC}$ and $V_{AC}$ with the proper relationship to the thresholds $V_{TH1}+$ and $V_{TH1}-$, as shown.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A generator system comprising:
   an AC machine including a plurality of armature coils;
   a rectifier circuit electrically coupled to the armature coils, said rectifier circuit including a plurality of switches; and
   a control circuit providing control signals to the rectifier circuit to switch the switches on and off to convert an AC signal to a DC signal, said control circuit determining whether phase-to-phase voltages of the machine are above a first predetermined threshold voltage or below a second predetermined threshold voltage, wherein the control circuit turns on a switch associated with a particular phase of the machine if the phase-to-phase voltage for that phase is greater than the first predetermined threshold voltage and turns off the switch if the phase-to-phase voltage for that phase is less than the second predetermined threshold voltage.

2. The system according to claim 1 wherein the control circuit determines the phase-to-ground voltage of the armature coils, and calculates the phase-to-phase voltages from the phase-to-ground voltages.

3. The system according to claim 1 wherein the control circuit directly measures the phase-to-phase voltages of the armature coils.

4. The system according to claim 1 wherein the control circuit determines whether the speed of the machine is below a predetermined speed threshold, and prevents the switches from being turned on if the speed of the machine is below the speed threshold.

5. The system according to claim 1 wherein the switches are MOSFET switches.

6. The system according to claim 1 wherein the machine includes three armature coils.

7. The system according to claim 6 wherein the control circuit calculates six phase-to-phase voltages based on three phase-to-ground voltages of the three phases associated with the armature coils.

8. The system according to claim 6 wherein the control circuit calculates three phase-to-phase voltages based on three phase-to-phase ground voltages of the three phases associated with the armature coils.

9. The system according to claim 6 wherein the three armature coils are electrically substantially symmetric.

10. The system according to claim 1 wherein the first predetermined threshold voltage is a positive value and the second predetermined threshold voltage is different than of the first predetermined threshold voltage.

11. The system according to claim 1 wherein the rectifier circuit includes a diode electrically coupled across each switch.

12. The system according to claim 11 where the diodes are zener diodes with a voltage clamping capability.

13. The system according to claim 11 wherein the switches are MOSFET switches and wherein the diodes are integral body-drain diodes within the respective MOSFET switch.

14. A generator system for a vehicle, said system comprising:
   a three-phase AC machine including three armature coils;
   a rectifier circuit electrically coupled to the armature coils, said rectifier circuit including six MOSFET switches; and
   a control circuit providing control signals to the rectifier circuit to switch the MOSFET switches on and off to convert an AC signal from the machine to a DC signal, said control circuit determining the phase-to-ground voltage of the armature coils and calculating six phase-to-phase voltages from the phase-to-ground voltages, said control circuit further determining whether the phase-to-phase voltages of the machine are above a first predetermined threshold voltage and below a second predetermined threshold voltage where the control circuit turns on a switch associated with a particular phase of the machine if the phase-to-phase voltage for that phase is greater than the first predetermined threshold voltage and turns off the switch if the phase-to-phase voltage for that phase is less than the second predetermined threshold voltage.

15. The system according to claim 14 wherein the control circuit determines whether the speed of the machine is below a predetermined speed threshold, and prevents the switches from being turned on if the speed of the machine is below the speed threshold.

16. The system according to claim 14 wherein the rectifier circuit includes a diode electrically coupled across each switch.

17. The system according to claim 16 where the diodes are zener diodes with a voltage clamping capability.

18. The system according to claim 16 wherein the diodes are integral body-drain diodes within the respective MOSFET switch.

19. The system according to claim 14 wherein the first predetermined threshold voltage is a positive value and the second predetermined threshold voltage is different than the first predetermined threshold voltage.

20. A method for rectifying an AC signal from an AC machine, said method comprising:
   determining the voltage between each phase of the machine and a predetermined ground;
   calculating phase-to-phase voltages from the phase-to-ground voltages;
   comparing the phase-to-phase voltages to a first predetermined threshold voltage and a second predetermined threshold voltage;
   turning on a switch associated with a particular phase of the machine if the phase-to-phase voltage for that phase is greater than the first predetermined threshold voltage; and turning off the switch if the phase-to-phase voltage for that phase is less than the second predetermined threshold voltage.

21. The method according to claim 20 further comprising determining the speed of the machine, and preventing the switches from being closed if the speed of the machine is less than a predetermined speed.

22. The method according to claim 20 wherein the AC machine is a three-phase AC machine including three armature coils.

23. The method according to claim 22 wherein determining the voltage between each phase of the machine and a predetermined ground includes determining three phase-to-ground voltages, and calculating the phase-to-phase voltages from the determining phase-to-ground voltages includes calculating six phase-to-phase voltages.

24. The method according to claim 20 wherein the switches are MOSFET switches.

25. The method according to claim 20 further comprising providing a diode electrically coupled across each switch.

26. The method according to claim 25 wherein the diodes are zener diodes having a voltage climbing capability.

27. The method according to claim 25 wherein the switches are MOSFET switches and wherein the diodes are integral body-drain diodes within the respective MOSFET switch.

* * * * *